(12) United States Patent
Okamoto et al.

(10) Patent No.: US 6,780,075 B2
(45) Date of Patent: Aug. 24, 2004

(54) METHOD OF FABRICATING NANO-TUBE, METHOD OF MANUFACTURING FIELD-EMISSION TYPE COLD CATHODE, AND METHOD OF MANUFACTURING DISPLAY DEVICE

(75) Inventors: Akihiko Okamoto, Tokyo (JP); Fuminori Itoh, Tokyo (JP)

(73) Assignee: NEC Corporation, Tokyo (JP)

( * ) Notice: Subject to any disclaimer, the term of this patent is extended or adjusted under 35 U.S.C. 154(b) by 481 days.

(21) Appl. No.: 09/746,114

(22) Filed: Dec. 22, 2000

(65) Prior Publication Data

US 2001/0006869 A1 Jul. 5, 2001

(30) Foreign Application Priority Data

Dec. 24, 1999 (JP) ............................................ 11-368424

(51) Int. Cl.$^7$ ................................ H01J 9/00; H01J 9/02
(52) U.S. Cl. .............................. 445/50; 445/49; 445/51
(58) Field of Search ............................. 445/49, 50, 51, 445/24, 25; 427/77

(56) References Cited

U.S. PATENT DOCUMENTS

| | | | | |
|---|---|---|---|---|
| 5,588,893 A | * | 12/1996 | Kaftanov et al. | 445/50 |
| 6,090,363 A | * | 7/2000 | Green et al. | 427/216 |
| 6,280,677 B1 | * | 8/2001 | Yakobson | 264/430 |
| 6,283,812 B1 | * | 9/2001 | Jin et al. | 445/51 |
| 6,645,402 B1 | * | 11/2003 | Kurokawa et al. | 445/50 |
| 2002/0006489 A1 | * | 1/2002 | Goth et al. | 428/36.9 |
| 2003/0044519 A1 | * | 3/2003 | Takai | 445/51 |

FOREIGN PATENT DOCUMENTS

| | | | |
|---|---|---|---|
| JP | 6-184 738 | 7/1994 | |
| JP | 7-57682 | 3/1995 | |
| JP | 7-172807 | 7/1995 | |
| JP | 9-221309 | 8/1997 | |
| JP | 10-12124 | 1/1998 | |
| JP | 10-199398 | 7/1998 | |
| JP | 11-162383 | 6/1999 | |
| WO | WO 98/05920 | 2/1998 | |
| WO | WO 98/39250 | 9/1998 | |
| WO | WO 9966523 A1 * | 12/1999 | H01J/1/30 |

* cited by examiner

*Primary Examiner*—Nimeshkumar D. Patel
*Assistant Examiner*—Mariceli Santiago
(74) *Attorney, Agent, or Firm*—Scully, Scott, Murphy & Presser

(57) ABSTRACT

A method of fabricating a nano-tube that enables shortly cutting off the nano-tube without deteriorating the same and that when the nano-tube is used as the emitter can provide an improved flat-ability of the surface of the emitter, a method of manufacturing a field-emission type cold cathode that can provide an improved flat-ability of the surface of the emitter and that resultantly can cause an emission of a uniform, stable high-emission electric current, and a method of manufacturing a display device that includes a method of fabricating a nano-tube and/or a method of manufacturing a field-emission type cold cathode. The method of fabricating a nano-tube according to the present invention includes the step of radiating ions into a nano-tube and the step of oxidizing the nano-tube.

4 Claims, 5 Drawing Sheets

METHOD OF FABRICATING NANO-TUBE, METHOD OF MANUFACTURING FIELD-EMISSION TYPE COLD CATHODE, AND METHOD OF MANUFACTURING DISPLAY DEVICE

BACKGROUND OF THE INVENTION

1. Field of the Invention

The present invention relates to a method of fabricating a nano-tube that is suitably used for manufacturing a field-emission type cold cathode that is used as an electron source of a planar panel display, CRT, electron microscope, electron-beam exposure device, various electron-beam devices, etc. The invention also concerns a method of manufacturing the field-emission type cold cathode, as well as a method of manufacturing a display device.

2. Description of the Related Art

Attention has in recent years been drawn toward a carbon nano-tube as emitter material of a field-emission type cold cathode. Applications of the carbon nano-tube have been expected to occur and research and developments thereof have also been vigorously performed.

The carbon nano-tube is a type obtained by rounding a graphen sheet having carbon atoms regularly arranged, a planar graphite hexagonal net, into a tube-like configuration. Depending upon the diameter of the tube and the chiral angle, the electronic structure is largely varied. Therefore, the co-efficient of electrical conduction has a value between a metal and a semiconductor.

Therefore, it is the that the carbon nano-tube exhibits characteristic in that an electrical conduction thereof being close to one-dimensional electrical conduction.

This carbon nano-tube is a minute material, the diameter of that is in the order of nano-meters, the length of that is from 0.5 μm to several millimeters, and an aspect ratio of that is very high. For this reason, electric field is easily concentrated at end tip portion of the carbon nano-tube and thereby it is expected that a high level of emitted-current density can be obtained.

Also, the carbon nano-tube has the feature of having a high level of chemical and physical stability. Therefore, it can be presumed that, during its operation, the carbon nano-tube would not be adversely affected by the adsorption of residual gases, ion impact or the like, in a vacuum, easily.

FIG. 7 is a sectional view illustrating an example of a conventional field-emission type cold cathode, wherein the carbon nano-tube is used as the field-emission type cold cathode. It is to be noted that this type of field-emission type cold cathode is disclosed in the Japanese Unexamined Patent Publication (KOKAI) No. 9-221309.

This field-emission type cold cathode has a substrate 24 including carbon therein, on which a carbon nano-tube 26 to be used as an emitter, is formed by radiating ions onto the substrate 24. Further, gate electrodes 28, 28 and an insulating layer 27 are formed so as to surround the carbon nano-tube 26.

A grid 29 through which an electron beam is drawn out, is formed so as to oppose the carbon nano-tube 26.

The carbon nano-tube 26 has a diameter of from 2 to 50 nm and has a length of from 0.01 to 5 μm.

In this field-emission type cold cathode, an emission current of 10 mA is caused to occur with a voltage of 500V.

In this field-emission type cold cathode, the insulating layer 27 and the gate electrode 28 are formed so as to surround the carbon nano-tube 26. Therefore, the amount of electrons that are emitted from the emitter can be controlled by an electric field that is formed applied between the gate and the emitter. Here, the electric field between the gate and the emitter is approximately equal to a value obtained by dividing the voltage applied to the gate by the thickness of the insulating layer 27.

Note that, in case the thickness of the insulating layer 27 is large, it is necessary to apply a high level of gate voltage. However, in case the thickness of the insulating layer 27 is small, the same emission current can be obtained with a small gate voltage.

On the other hand, the electrons that have been emitted from the emitter each have a kinetic energy acting into a direction perpendicular to the electron emitting direction, depending upon the gate voltage. Therefore, the direction of the emission path of the emitted electrons are spread out.

In case of the gate voltage being low, it is possible to obtain an electron beam relatively highly bundled or having high level of coherency.

However, as the gate voltage becomes high, the degree of divergence of the electrons in the beam increases.

For example, in a planar display device in that a plurality of pixels are independently controlled, the divergence of the emitted electrons mean that the electrons directed toward one pixel, impinge upon an adjacent pixel. Thereby, the inconvenience in that an image becomes blur, or the contrast thereof is degraded or the like, will be caused to occur.

Accordingly, a decrease in the thickness of the insulating layer 27 is an indispensable factor for realizing a decrease in the drive voltage, a reduction in the size and cost of the drive circuit, a suppression in the spread of the electron beam or the like, FIGS. 8(a) and 8(b) illustrate an example of a conventional planar display device, FIG. 8(a) being a perspective view and FIG. 8(b) being a sectional view. This planar display device is disclosed in the Japanese Unexamined Patent Publication (KOKAI) No. 10-199398.

In this planar display device, on a glass substrate 34, rectangular cathodes 35 made of graphite and having a thickness of 1 μm and an insulating layers 37 made of a silicon oxide film and having a thickness of 7 μm, and width thereof being 20 μm, are stacked with each other.

On the cathode 35, there is deposited using an arc discharge technique, a laser ablation technique or the like, a carbon nano-tube 36 having a rectangular configuration and having a thickness of several μm and that becomes an electron emission layer arranged in a line.

On the rectangular carbon nano-tube 36, there are provided grid electrodes 38, through which the electrons are drawn out, in such a way as to cross the carbon nano-tube 36.

The carbon nano-tube 36 has a diameter of from 10 to 40 nm and a length of from 0.5 to several μm.

In this planar display device, applying a positive voltage to the grid electrode 38 and applying a negative voltage to the cathode 35 cause electrons 39 to be emitted in the arrow-indicated direction as shown in FIG. 8(b).

FIG. 9 is a sectional view illustrating an electron-source array that is another example of the conventional field-emission type cold cathode, and that is disclosed in the Japanese Unexamined Patent Publication (KOKAI) No. 10-12124.

This electron-source array is the one wherein a carbon nano-tube 46 is grown in each of the fine holes 42 of an aluminum film 45.

This electron-source array is manufactured as follows. First, the aluminum film 45 is deposited on a glass substrate 41. This aluminum film 45 is etched to thereby form an element isolation region 44 within the aluminum film 45. The remaining aluminum film 45 is used as an emitter region.

Subsequently, anodic-oxidation treatment is performed on the aluminum film 45 to thereby form the fine holes 42. Thereafter, in each of the fine holes 42 there is buried a nickel particle 47 that becomes a nucleus of growth of the carbon nano-tube.

Thereafter, the nano-tube 46 is grown in an atmosphere containing therein methane gas and hydrogen gas. The reaction temperature at this time is ranging from 1000 to 1200° C.

With the use of the above-described procedure, it is possible to grow on the glass substrate 41 the carbon nano-tube 46 that has orientation in the vertical direction with respect to the substrate 41. And, by attaching a grid electrode 48 onto an upper portion of the aluminum film 45, it is possible to manufacture a field-emission type cold cathode.

Also, a phosphor 49 is disposed at a position that opposes a plurality of emitters, i.e., carbon nano-tubes 46, each of which is isolated from each other by respective element isolation region 44 to thereby fabricate a planar display device.

Further, as an example of the method of fabricating a carbon nano-tube, there has also been proposed a method that includes a step of disconnecting part of the bond of each of the carbon atoms constituting the carbon nano-tube. The step thereby forms a non-bonded electron (dangling bond) (refer to the Japanese Unexamined Patent Publication (KOKAI) No. 7-172807).

In this method, a gold ion ($Au^+$) was used as an example, a crater structure is formed by one ion radiation. For example, selectively radiating a large number of ions onto the carbon nano-tube so as to cross over the carbon nano-tube, a plurality of crater structures are successively formed. And these crater structures are connected with one another, thereby the carbon nano-tube is disconnected.

Meanwhile, in the conventional field-emission type cold cathode illustrated in FIG. 7, in realizing an excellent electron-emission characteristic by making the insulating layer to have a thin thickness, the following problems arose.

(1) Flattening the surface of the emitter is difficult.

The carbon nano-tube obtained using the arc discharge technique or laser ablation technique that is a general carbon nano-tube manufacturing method, generally has a substantially constant value in diameter that is in an order of nanometers.

However, the length thereof shows various values raging from 0.5 $\mu$m to several mm. Also, because the carbon nano-tube has a high flexibility, it has the feature of one nano-tube being easily entangled with each other. Therefore, when the long carbon nano-tubes are entangled with each other, they get shaped like a large yarn junk. This causes a decrease in the flatness of the emitter.

Also, the coarse carbon nano-tube after the same has been produced contains therein graphite, amorphous carbon or the like, In case of especially a mono-layer carbon nano-tube, it contains a metal catalyst. The carbon nano-tube can be easily entangled with such impurities as well to thereby form a large mass.

It results in that local protrusions will occur on the surface of the emitter. These local protrusions cause to form a curvature in the insulating layer 57 and gate electrode 58 formed on the carbon nano-tube 56 on the substrate 54 and make the potential distribution non-uniform as illustrated in FIG. 10.

Also, when the local protrusions are produced at the opening portion of the gate, the electric field is easily concentrated at this portion, reducing the uniformity of the electron-emission characteristic thereof deteriorated.

Furthermore, in the planar display device wherein a plurality of emitters are two-dimensionally arrayed, those large protrusions make the characteristic of one of the emitter portions, i.e., the pixels, different from those of other emitter positions (the pixels).

This causes unevenness in the image.

(2) The gate electrode and the emitter are electrically conducted to each other via the carbon nano-tube.

In case the carbon nano-tube having a length larger than the thickness of the insulating layer exists on the surface of the emitter, that carbon nano-tube contacts with the gate electrode 58. There is resultantly the case where the gate electrode 58 and the carbon nano-tube 56 serving as the emitter electrically conduct with each other.

This short-circuit between the carbon nano-tube 56 and the gate electrode 58 becomes a cause of the decrease in the amount of electrons emitted and a cause of the destruction of the elements. As in the case of the above-described problems under the item No. (1), that short-circuit of the gate electrode and the emitter becomes a factor that causes the electron-emission characteristic to become non-uniform. Especially in the planar display device, the short-circuit makes the image uneven in many positions and also makes the image unstable.

In this field-emission type cold cathode, the length of the carbon nano-tube 26 is ranging from 0.01 to 5 $\mu$m. However, for example, in case the thickness of the insulating layer 27 is 5 $\mu$m or less, as described above, there is a possibility that the gate electrode 28 and the emitter will be short-circuited by way of the carbon nano-tube 26. Or there is also a possibility that a mass of carbon nano-tube, having a length L being large, will locally occur inside the gate opening.

Also, in the conventional planar display device as well that is illustrated in FIG. 8, in case in that a large number of carbon nano-tubes each having a length being larger than the thickness (7 $\mu$m) of the insulating layer 37, are contained therein, the same problems arise.

Further, in each of these two conventional examples, the carbon nano-tube is grown directly on the substrate. Therefore, it is difficult to control the length of this carbon nano-tube. Accordingly, in these conventional examples, realizing a uniform electron emission characteristic is difficult, which means that a limitation is imposed upon making a thickness of the insulating layer, thin.

Also, in the conventional electron-source array illustrated in FIG. 9, it is certainly possible to grow the carbon nano-tube 46 with a high control-ability in the direction perpendicular to the surface of the glass substrate 41. However, the growth temperature of the carbon nano-tube 46 is approximately 1000° C. and the relevant steps for forming same, are complex. Therefore, this technique is unsuitable for manufacturing a planar display or the like, wherein a plurality of emitters are formed on the glass substrate 41.

Also, in the conventional fabricating method of carbon nano-tube, because use is made of a convergent ion source, there was the problem that a long time was needed to cut off the carbon nano-tube through the entire surface of the emitter. Also, in an ordinary ion implantation, in case radiation has been performed until the carbon nano-tube is cut off, ions cause damage even to the portion that is not to be cut off. Resultantly, there was the problem that the most part of the carbon nano-tube became unable to have its annular shape maintained as it was.

SUMMARY OF THE INVENTION

The present invention has been made under the above-described draw-backs and has an object to provide a method of fabricating a nano-tube that enables cutting off the nano-tube in a short length without deteriorating the same and that, when using this nano-tube as the emitter, provides an improved flatness of the surface thereof.

Another object of the invention is to provide a method of manufacturing a field-emission type cold cathode that can provide an improved flat-ability of the emitter surface and that can therefore cause an emission of a uniform, stable high-emission electric current.

Still another object of the invention is to provide a method of manufacturing a display device that includes the above-described fabrication method of nano-tube and/or manufacturing method of a field-emission type cold cathode.

To attain the above object, the present invention has provided the following nano-tube fabrication method, field-emission type cold cathode manufacture method, and display device manufacture method.

Namely, a fabrication method of a nano-tube according to the first aspect of the invention comprises the step of radiating ions onto the nano-tube, and oxidizing the nano-tube.

In this fabrication method of a nano-tube, with a very much simplified method, the nano-tube has been provided with a non-bonded hand, i.e., the dangling bond, therein and is oxidized. Thereby, the nano-tube becomes able to be easily severed at the non-bonded hand without deteriorating the nano-tube. As a result of this, the length of the nano-tube is shortened, and the mutual entangles between or among the nano-tubes are lessened. If using this nano-tube as the emitter, the surface of the emitter has an improved flatness.

A fabrication method of a nano-tube according to the second aspect of the invention is constructed in a form wherein, in the fabrication method of a nano-tube according to the first aspect of the invention, in the ion radiating step, after an element had been ionized, the resultant ions are accelerated by an electric field and thereby radiated onto the nano-tube.

A fabrication method of a nano-tube according to the third aspect of the invention is constructed in a form wherein, in the fabrication method of a nano-tube according to the first aspect of the invention, an element had been reduced into plasma condition and the ions that have been produced in the plasma condition creating process, are radiated onto the nano-tube.

A fabrication method of a nano-tube according to the fourth aspect of the invention comprises the step of heating the nano-tube at a temperature of from 300 to 800° C., and radiating ions onto the nano-tube thus-heated.

A fabrication method of a nano-tube according to the fifth aspect of the invention comprises the step of heating the nano-tube at a temperature of from 300 to 800° C., and radiating an atomic state of atoms and ions onto the nano-tube thus-heated, simultaneously.

A fabrication method of a nano-tube according to the sixth aspect of the invention comprises the step of heating the nano-tube at a temperature of from 300 to 800° C., and radiating ions onto the nano-tube thus-heated, and oxidizing the nano-tube.

A fabrication method of a nano-tube according to the seventh aspect of the invention comprises the step of placing the nano-tube on a glass substrate, heating the nano-tube at a temperature of from 300° C. to a temperature lower than a distortion point of the glass substrate, radiating ions onto the nano-tube thus-heated, and oxidizing the nano-tube.

A fabrication method of a nano-tube according to the eighth aspect of the invention comprises the step of heating the nano-tube at a temperature of from 300 to 800° C., radiating ions and an atomic state of atoms onto the nano-tube thus-heated, simultaneously, and oxidizing the nano-tube.

A fabrication method of a nano-tube according to the ninth aspect of the invention comprises the step of placing the nano-tube on a glass substrate, heating the nano-tube at a temperature of from 300° C. to a temperature lower than a distortion point of the glass substrate, radiating ions and an atomic state of hydrogen onto the nano-tube thus-heated simultaneously, and oxidizing the nano-tube.

A fabrication method of a nano-tube according to the tenth aspect of the invention comprises the step of radiating ions onto the nano-tube, heating the nano-tube at a temperature of from 300 to 800° C., and radiating ions onto the nano-tube thus-heated.

A fabrication method of a nano-tube according to the eleventh aspect of the invention comprises the step of radiating ions onto the nano-tube, heating the nano-tube at a temperature of from 300 to 800° C., and radiating ions and an atomic state of atoms onto the nano-tube thus-heated, simultaneously.

A fabrication method of a nano-tube according to the twelfth aspect of the invention is constructed in a form the nano-tube is a carbon nano-tube.

A manufacturing method of a field-emission type cold cathode, the manufacturing method comprising an emitter containing therein nano-tubes, an insulating layer and gate electrode provided so as to surround the emitter, and an anode electrode provided on the gate electrode to thereby cause an emission of electrons from the emitter by applying a voltage to the emitter, the method comprising the steps of, introducing a gas onto the emitter, applying a voltage to one of the gate electrode, the anode electrode, and a newly provided electrode to thereby cause an emission of the electrons, ionizing the gas, and radiating the ions onto the nano-tubes.

A manufacturing method of a field-emission type cold cathode, the manufacturing method comprising an emitter containing therein nano-tubes, an insulating layer and gate electrode provided so as to surround the emitter, and an anode electrode provided on the gate electrode to thereby cause an emission of electrons from the emitter by applying a voltage to the emitter, the method comprising the steps of, introducing a gas onto the emitter, applying a voltage to one of the gate electrode, the anode electrode, and a newly provided electrode to thereby cause an emission of the electrons, ionizing the gas, radiating the ions onto the nano-tubes, and oxidizing the nano-tubes.

In the method for producing the field-emission type cold cathode in the past, it is possible to form a flat emitter and, in addition, a great number of the severed portions are formed. Thereby, the portions from which electron are emitted is become large in number, and a high performance of the emission and an increase in number of the emission points within the emitter are realized. Resultantly, the uniformity is enhanced. Resultantly, it is possible to cause the generation of a uniform and stable high-emission current.

A manufacturing method of a display device, the display device being a flat-surface type, according to the fifteenth aspect of the invention, comprises the fabrication method of a nano-tube according to one of the first to twelfth aspects of the invention, and/or, the manufacturing method of a field-emission type cold cathode according to the thirteenth or fourteenth aspect of the invention.

DETAILED DESCRIPTION OF THE PREFERRED EMBODIMENTS

Preferred embodiments of the present invention related to a method of fabricating a nano-tube, a method of manufacturing a field-emission type cold cathode, and a method of manufacturing a display device will now be explained hereunder with reference to the drawings.

First Embodiment

Figure 1:
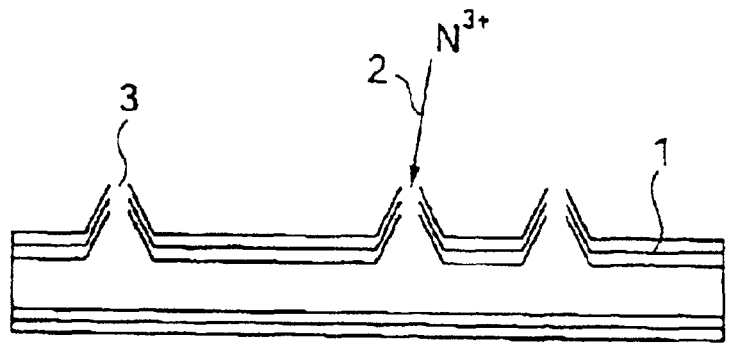
FIGS. 1(a) and 1(b) are step views illustrating a method of fabricating a nano-tube according to a first embodiment of the present invention, FIG. 1(a) being a typical view a state where nitrogen ions are being radiated onto the nano-tube, and FIG. 1(b) being a typical view illustrating a state that prevails after oxidation is performed.
Figure 1:
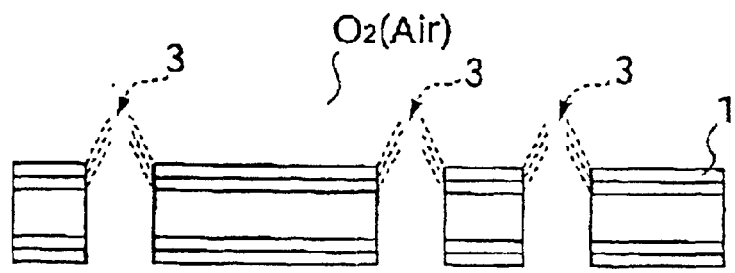

FIG. 1(a) and FIG. 1(b) are view illustrating an example of the method of fabricating a nano-tube according to a first embodiment of the present invention, in which a carbon nano-tube is used as the nano-tube.

In this fabrication method, first, by making use of the arc discharge method, the carbon nano-tube has been produced.

Here, in a case of nickel (Ni) and yttrium (Y) being used, as catalyst, mono-layer carbon nano-tubes are produced in a state where they are connected together into a bundled condition, in parallel with each other.

Also, in a case of no catalyst being used, a multi-layer carbon nano-tube is produced.

Subsequently, the carbon nano-tubes that have been deposited within a reaction chamber as if they were pieces of soot are collected. The carbon nano-tubes thus collected are in a state where a plurality of long carbon nano-tubes are entangled with each other.

Subsequently, using a mass of the entangled carbon nano-tubes as a sample, nitrogen ions ($N^+$) have been radiated onto this sample.

FIG. 1(a) is a schematic view illustrating a state of the carbon nano-tube 1 after the nitrogen ion ($N^+$) 2 has been radiated thereto.

By the ion, a part of the bond of the carbon atom constituting a multi-layer carbon nano-tube is broken to thereby form a non-bonded portion, thereby a non-bonded hand 3, i.e., the dangling bond, is produced.

In this state, when the resulting carbon nano-tube is heated in, for example, an atmosphere of low-pressure oxygen or an air, oxidization starts to occur on the non-bonded hand 3, such as the dangling bond.

Thereby, as illustrated in FIG. 1(b), at the portion of this non-bonded hand 3, the carbon nano-tube 1 is dis-connected. The non-bonded hand 3 of the carbon nano-tube 1 is chemically unstable and, compared with the bonded carbon, is likely to react with oxygen molecules, or the like.

It is to be noted that an ion and a radical must have a sufficient level of energy to form the non-bonded hand 3 in the carbon nano-tube 1.

In this embodiment, using nitrogen ions ($N^+$) as the ions, ion implantation was performed with an acceleration voltage of 25 KV and at an ion concentration of $1 \times 10^{13}$ cm$^{-3}$.

The optimum acceleration voltage, the kind of ion, and the amount of ion to be implanted are depended upon the amount of the carbon nano-tube 1 to be used and the degree of filling density of the carbon nano-tubes 1 to be fabricated, as well as the kind of the carbon nano-tubes 1 (especially, depending upon whether they are multi-layer carbon nano-tubes or mono-layer nano-tubes).

Also, in case of multi-layer carbon nano-tubes, they are depended particularly upon the number of the layers. However, if the acceleration voltage is 50V or less, there is almost no effect.

On the other hand, if the acceleration voltage is 10 KV or more, the number of the ions passed through the carbon nano-tubes becomes large resulting in the efficiency thereof becoming bad.

Also, in place of ion implantation, argon (Ar) was treated by by plasma discharging so as to ionize the argon and it was radiated onto the carbon nano-tubes 1. Here, the carbon nano-tubes 1 were introduced onto a parallel/flat-plate type ground electrode.

Argon (Ar) then was introduced under a pressure of from $1.33 \times 10^{-1}$ to $1.33 \times 10^{-5}$ Pa ($1 \times 10^{-3}$ to $1 \times 10^{-7}$ Torr) while a bias voltage of 500V was applied to an opposite electrode to the parallel/flat-plate type ground electrode. Thereby, the ions were accelerated and radiated.

The optimum acceleration voltage, the kind of ion, and the amount of ion implanted are depended upon the amount of, and the degree of a filling density of the carbon nano-tubes 1 to be fabricated, as well as the kind of the carbon nano-tubes 1 (especially, whether they are multi-layer carbon nano-tubes or mono-layer nano-tubes).

Also, in case of multi-layer carbon nano-tubes, the dependency is particularly depended upon the number of the layers. However, in case of the acceleration voltage being 50V, almost no effect was seen in the formation of the non-bonded hand 3, while in case of the acceleration voltage being 5 KV or more, abnormal discharge being locally occurred within the reactor.

In the carbon nano-tubes 1 having made through the above-described manufacturing process, the hands of the bond between the carbon atoms at the side surface of the tube were broken, thereby the non-bonded hand 3, i.e., the dangling bond, was formed.

The sample that had been treated in the above-described way was introduced into an oxidizing reactor and was heated in an atmosphere of low-pressure oxygen for a 1 hour. In case of the mono-layer carbon nano-tubes, the sample was heated at 300° C. and, in case of the multi-layer carbon nano-tubes, was heated at 600° C. The thus-heat-treated carbon nano-tubes were observed using an electronic microscope. As a result, a large number of the carbon nano-tubes the bonds of that had been dissociated were observed.

On the other hand, the sample that had not been radiated with ions was heated in an atmosphere of low-pressure oxygen under the same conditions. The thus-heat-treated carbon nano-tubes were observed using an electronic microscope.

As a result, almost no sections of the severed carbon nano-tubes were observed.

Through making use of the fabrication method of this embodiment, after having formed the insulating film and gate electrode, it is possible to sever the carbon nano-tubes and increase the emission points.

Through adding the fabrication method of this embodiment to a step of activating the emitter, i.e., an aging step, it is possible to increase an electric-current emission and thereby to increase the uniformity.

In this embodiment wherein making use of the ion implantation technique, compared to the conventional example using a focusing ion source, the time length during which ion radiation is performed is 10 times or more as large.

Even taking the oxidizing step into the account, a plurality of samples can simultaneously be treated, thereby it is possible to increase the throughput.

In addition, the variation within the substrate and the variation between the substrates each are also controlled. Therefore, the uniformity within the plane and the degree of severance of the carbon nano-tubes for each radiation, i.e., the average of the lengths of the carbon nano-tubes and the dispersion thereof, each are almost the same between the samples. Resultantly, the productivity is remarkably enhanced.

In addition, because the carbon nano-tube 1 is oxidized from the non-bonded hand 3, no non-bonded hand 3 exists at the side surface of the portion of the carbon nano-tube that has remained as is without being oxidized.

Therefore, the carbon nano-tubes do not have any portion in which such non-bonded hand 3 have been still remained unused, therein, and namely, the carbon nano-tubes have no deteriorated portion therein.

Accordingly, no carbon removed from the non-bonded hand 3 due to oxidation, or the like, during and after the fabrication process of the carbon nano-tube, is occurred and subsequent severance of the carbon nano-tubes would not also be occurred, accordingly.

This means that the fall-off of the carbon-nano-tube from the emitter, is difficult to occur and thus the electric discharge and short-circuit resulting from the carbon nano-tube that has thus fallen off, and the breakage of the device resulting therefrom are difficult to occur.

In case of the conventional method, the carbon nano-tubes that have been entangled with each other in the above-described way, will become a mass whose size is from 10 to 100 μm or so. Therefore, in case of forming an emitter containing the carbon nano-tubes therein by using a coating method, especially in case of utilizing a flat-plate like emitter whose thickness is less than 100 μm, concaved portions and convexed portions, a difference in height thereof existing therebetween ranging from 10 to 100 μm, are produced in a way in that one of them being formed at a portion in which the carbon nano-tube exists and another one being formed at a portion in which no carbon nano-tube exists.

Resultantly, emission of the electrons concentratedly takes place especially from the areas where the convexities exist. Therefore, within the emitter, non-uniformity of the emission occurs.

On the other hand, in the fabrication method of this embodiment, the above-micronize carbon nano-tubes are coated after having been mixed into the mother material of the emitter, such as glass paste.

In this case, because of the micronization of the carbon nano-tubes, these tubes are free from the entanglement with one another and become easy to mix with the mother material.

Resultantly, in case having formed such carbon nano-tubes as the emitter, these tubes become uniformly mixed with the mother material, thereby the emitter becomes flat.

For the carbon nano-tubes that have been formed in this way, the controlling the time length of radiation of the ions and the time length of heating in an atmosphere of oxygen to the carbon nano-tubes, and the controlling the length of the tubes through centrifugation, or the like can be enabled.

It thereby becomes possible to regularly arrange the length thereof according to the thickness of the insulating film defining the distance between the emitter and the gate electrode.

Thereby, the problem that the gate electrode and the emitter are electrically conducted to each other, can be resolved.

In addition, during or after the coating of the emitter material containing the carbon nano-tubes on the substrate, the resulting substrate is heated at a temperature equal to or lower than the distortion point of the substrate, thereby the emitter is formed.

Therefore, the problems that the temperature of the substrate becomes high, the process steps become complex, or the like, can be resolved.

By using the carbon nano-tubes obtained according to the fabrication method of this embodiment is used as the emitter and disposing the anode electrode or the anode electrode and gate electrode, construction is made of a diode structure or triode structure.

And, with the emitter potential being used as a reference, a positive potential is applied to the anode electrode or gate electrode. In this case, a problem as would be occurred in a conventional method, in that the non-uniformity of electric-field distribution that the electric field becomes concentrated onto the convexity portions of the emitter having the concaved portions and convexities therein and resultantly the electric field at the concavity portions becomes weak, can be resolved.

Resultantly, the non-uniformity of the electron emission characteristic can be avoided.

Second Embodiment

Figure 2:
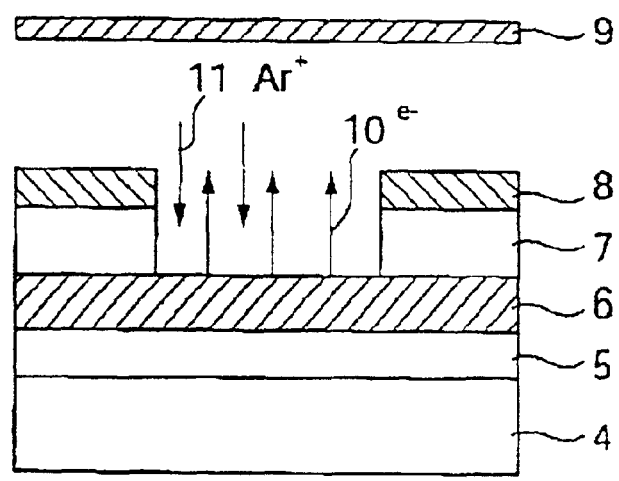
FIG. 2 is a sectional view illustrating the method of fabricating a nano-tube according to a second embodiment of the present invention.

FIG. 2 is a sectional view illustrating the fabrication method of a nano-tube according to a second embodiment of the present invention. This second embodiment illustrates an example wherein ions are radiated to the insulating film and gate electrode after when they are formed in the emitter.

In this fabrication method, first, an emitter electrode 5 consisting of metal is formed on a glass substrate 4. On this emitter electrode 5 there is formed an emitter 6 containing therein the carbon nano-tubes.

And, on this emitter 6, there are formed a gate-insulating film 7 having a thickness of 10 $\mu$m and a gate electrode 8 in this order.

Further, at a position approximately 1 mm away from the emitter 6, there is disposed an anode electrode 9 opposing to the emitter 6.

In this state, argon (Ar) gas is introduced under a pressure of $1.33 \times 10^{-1}$ to $1.33 \times 10^{-5}$ Pa ($1 \times 10^{-3}$ to $1 \times 10^{-7}$ Torr).

Subsequently, the voltage of 50V is applied to the gate electrode 8, and the voltage of 5 KV is applied to the anode electrode 9, to thereby cause an emission of electrons from the emitter 6 containing therein the carbon nano-tubes.

In this state, when the electron ($e^-$) 10 emitted from the carbon nano-tube, impinges on argon (Ar) gas molecule, the argon gas becomes a positive argon ion ($Ar^+$) 11.

Therefore, the argon gas is accelerated toward the gate electrode 8 and the emitter 6 containing therein the carbon nano-tubes to thereby impinge on the gate electrode 8 and emitter 6 containing therein the carbon nano-tubes.

At this time, the carbon bonds constituting the carbon nano-tube, are broken, thereby the non-bonded hand, i.e., the dangling bonds, are formed.

Subsequently, in place of the argon (Ar) gas, oxygen gas (O2) or air is introduced.

In a case of the sample being a mono-layer carbon nano-tube, heating is performed at 300° C., and in a case of the sample being a multi-layer carbon nano-tube, heating is performed at 600° C.

At this temperature, the sample is maintained for a 1 hour. After this heat treatment, the carbon nano-tube was observed using an electronic microscope.

As a result, the severed carbon nano-tube was observed in large number.

On the other hand, the sample to which no ion was radiated, was heated in an atmosphere of oxygen under the same conditions, and the resulting sample was observed using an electronic microscope.

As the result, the section of the severed carbon nano-tube was almost not observed at all.

It is to be noted that in this carbon nano-tube, the reaction of the carbon nano-tube with the oxygen gas is selectively caused from the non-bonded hand due to the oxygen, it was observed that the carbon nano-tube was partially severed.

Third Embodiment

Figure 3:
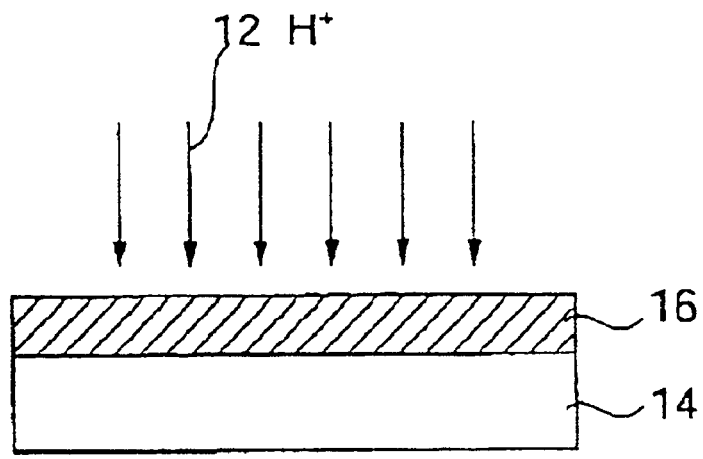
FIG. 3 is a sectional view illustrating the method of fabricating a nano-tube according to a third embodiment of the present invention.

FIG. 3 is a sectional view illustrating the fabrication method of a nano-tube according to a third embodiment of the present invention. This third embodiment is a method in that hydrogen gas ($H_2$) is ionized into ions ($H^+$) and it is radiated onto the carbon nano-tube to thereby form a non-bonded hand, and after that the carbon nano-tube is thereby severed.

In this fabrication method, using the same method as that in the first embodiment, there is prepared a sample having a glass substrate 14 and an emitter 16 containing therein the carbon nano-tubes and formed on the glass substrate 14.

This sample was introduced into a vacuum chamber, and the glass substrate 14 was maintained at a fixed temperature between 25° C. and 800° C.

And, in this state, hydrogen ions ($H^+$) 12 were radiated with an acceleration voltage of 1 KV and an ions number of $1 \times 10^{14}$ cm$^{-2}$.

Figure 4:
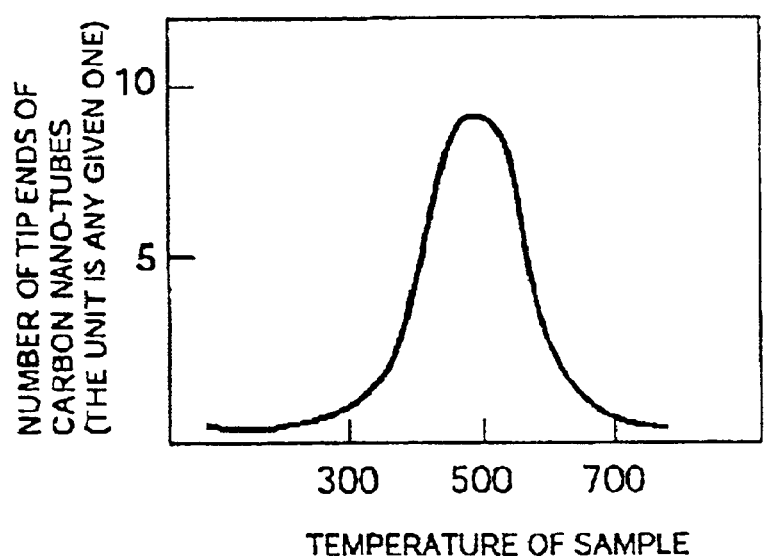
FIG. 4 is a view illustrating the relationship between the number of forward ends of the carbon nano-tubes at the time of radiation of hydrogen ions and the temperature of the specimens according to the third embodiment of the present invention.

FIG. 4 is a view illustrating the relationship between the number of tip ends of the severed carbon nano-tubes having been observed using an electronic microscope and the temperature (° C.) of the sample.

According to this FIG. 4, the number of the tip ends of the carbon nano-tubes has a maximum value when the temperature of the sample is approximately 500° C.

Also, it is clear that compared to the number of the tip ends portion of such severed carbon nano-tubes at room temperatures, the efficiency of severance thereof at a temperature of from 300° C. to 700° C., is relatively high.

Fourth Embodiment

Figure 5:
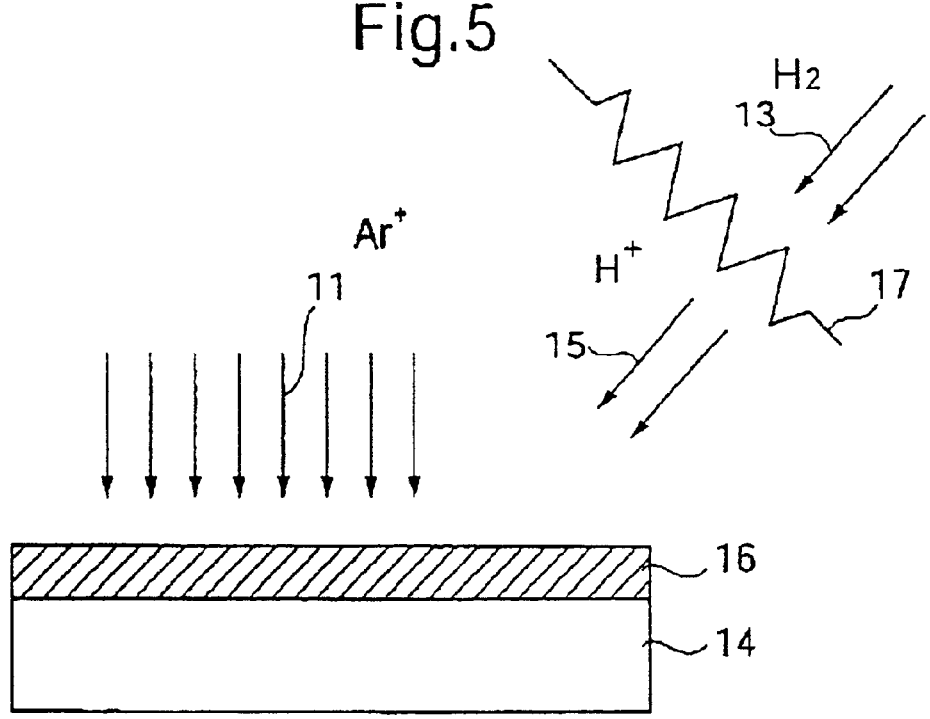
FIG. 5 is a sectional view illustrating the method of fabricating a nano-tube according to a fourth embodiment of the present invention.

FIG. 5 is a sectional view illustrating the fabrication method of a nano-tube according to a fourth embodiment of the present invention.

In this fourth embodiment, illustration is made of an example wherein argon ions ($Ar^+$) and hydrogen ions ($H^+$) are simultaneously radiated to the carbon nano-tube.

In this fabrication method, using the same method as in the first embodiment, there is prepared a sample wherein an emitter 16 containing therein the carbon nano-tubes is formed on the glass substrate 14.

This sample was introduced into a vacuum chamber. And, while maintaining the substrate 14 at a fixed temperature of from 25 to 800° C., argon ions ($Ar^+$) 11 was radiated with an acceleration voltage of 1 KV and an ions number of $1 \times 10^{12}$ cm$^{-2}$.

At the same time, a filament 17 was heated at approximately 2000° C.

Then, hydrogen gas ($H_2$) 13 is radiated to the filament 17 to thereby form an atomic state of hydrogen ($H^+$) 15, which thereafter was radiated onto the carbon nano-tubes of the emitter 16.

Figure 6:
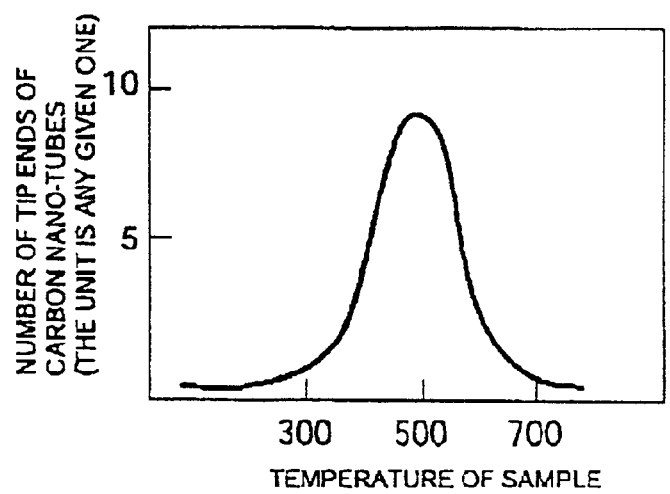
FIG. 6 is a view illustrating the relationship between the number of forward ends of the carbon nano-tubes at the time of radiation of argon ions and the temperature of the specimens according to the fourth embodiment of the present invention.
Figure 7:
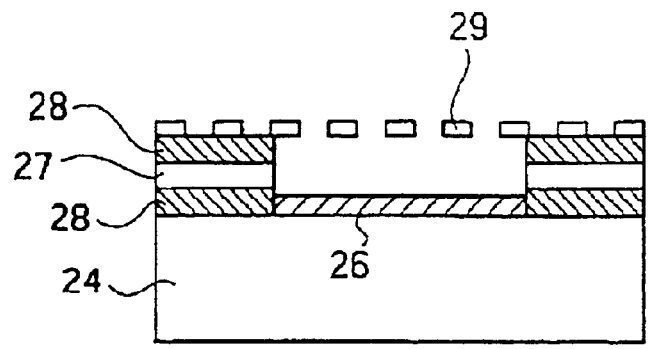
FIG. 7 is a sectional view illustrating an example of a conventional field-emission type cold cathode.
Figure 8:
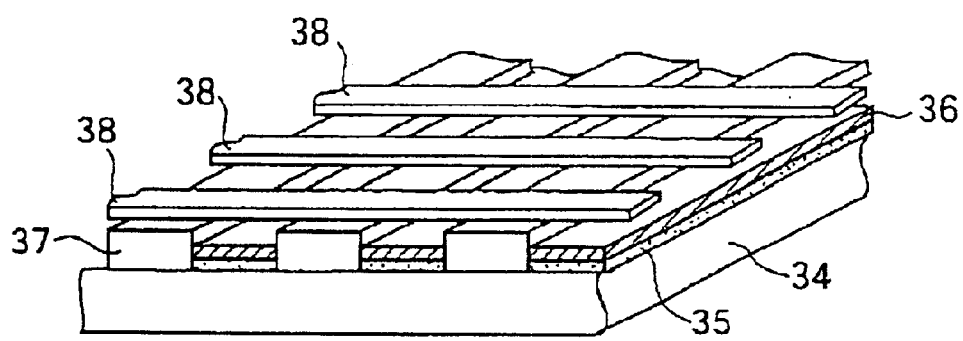
FIGS. 8(a) and 8(b) are views illustrating an example of a conventional display device, FIG. 8(a) being a perspective view thereof and FIG. 8(b) being a sectional view thereof.
Figure 8:
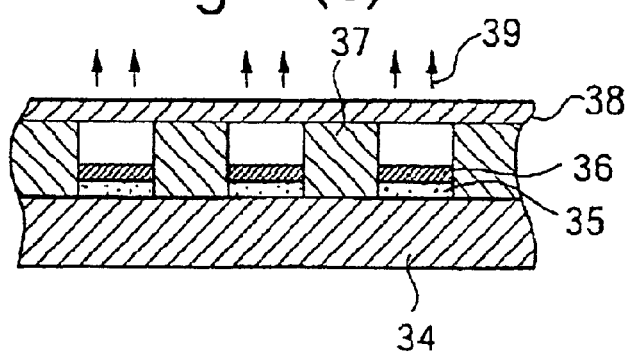
Figure 9:
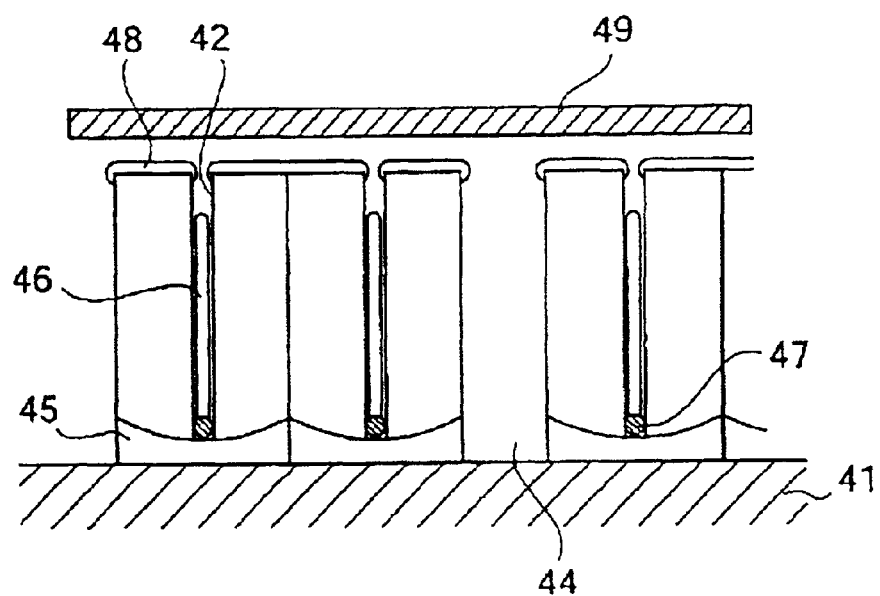
FIG. 9 is a sectional view illustrating an electron source array that is an example of a conventional field-emission type cold cathode.
Figure 10:
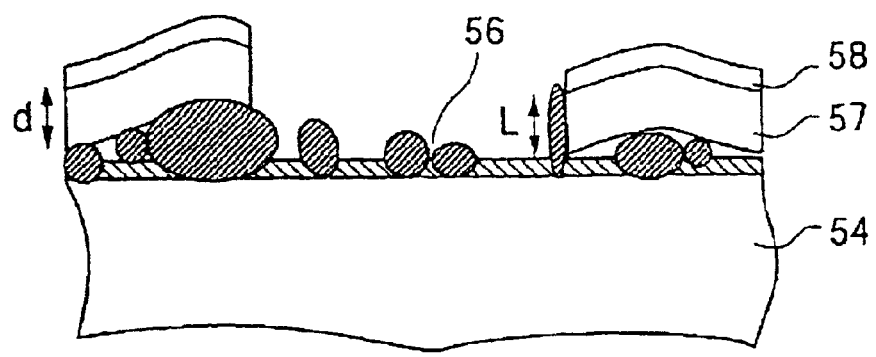
FIG. 10 is a sectional view illustrating an example of the inconvenience of the conventional field-emission type cold cathode.

FIG. 6 is a view illustrating the relationship between the number of tip ends of the severed carbon nano-tubes having been observed with using an electronic microscope and the temperature (° C.) of the sample.

According to the illustration of FIG. 6, the number of the tip ends of the carbon nano-tubes has a maximum value when the temperature of the sample was approximately 500° C.

Also, compared to the number of the severance of the carbon nano-tubes at room temperatures, the efficiency of severance of the carbon nano-tubes at a sample temperature of from 300° C. to 700° C., is seemed to be extremely high.

Note that, in a case in which the above-mentioned treatment had been applied to a sample in that the carbon nano-tubes were arranged on a glass substrate 14, it is preferable to treat the sample at a temperature equal to or lower than the distortion point of the glass.

In this embodiment, the severance of the carbon nano-tube is promoted.

The reason for this is, in addition to the effect of physical sputter made by hydrogen ions or argon ions, a generation of a chemical reaction through that a bonded substance of hydrogen radical and carbon radical such as methane (CH4) or the like, is produced due to a reaction being made between hydrogen and carbon, to thereby disconnection of carbon from the carbon nano-tube is promoted.

Apart from the method as mentioned above in this embodiment, there can exist separate methods in that the carbon nano-tubes can be broken efficiently without giving any damages thereon by utilizing a process comprising a combination of a step of chemical reaction between hydrogen and carbon constituting the carbon nano-tube and a step of oxidation and/or a process comprising a combination of a step of physically forming the non-bonded hand and a step of chemical reaction between hydrogen and carbon.

Note that when the process of comprising a combination of a step of chemical reaction between hydrogen and carbon constituting the carbon nano-tube and a step of oxidation was used, especially in the chemical reaction step, this reaction can be limited to the reaction with the carbon existing in the layer of the carbon nano-tube arranged on a surface of or in the vicinity of the surface of the carbon nano-tube.

Therefore, in this embodiment, the non-bonded hands, i.e., the dangling bonds, can be limited to be formed only in the layer of the carbon nano-tube which is arranged on a surface of or in the vicinity of the surface of the carbon nano-tube.

Accordingly, in the oxidizing process successively executed after the above-mentioned process, such layer arranged on a surface of or in the vicinity of the surface of the carbon nano-tube, is selectively removed therefrom or is more quickly removed comparing with the layer existing inside of the carbon nano-tubes.

For these reasons, since in the multi-layer carbon nano-tubes or the bundled mono-layer carbon nano-tubes, the layer arranged on a surface of the carbon nano-tubes, can easily be removed, selectively, it is possible to form the carbon nano-tubes having a diameter smaller than that of the coarsely produced carbon nano-tubes, or having a tapered portion therein.

On the other hand, when the process of comprising a combination of a step of physically forming the non-bonded hand and a step of chemical reaction between hydrogen and carbon, was used, especially in a case in that the non-bonded hands had been formed with accelerated ions, in the multi-layer carbon nano-tubes or the bundled mono-layer carbon nano-tubes, the non-bonded hands can be formed not only in the layer arranged on a surface of the carbon nano-tubes but also in the layer formed inside of the carbon nano-tubes.

Accordingly, it is possible to form the tip ends of the carbon nano-tube having a sharp-edged sectional configuration thereof or to form multi-layer carbon nano-tubes or bundled mono-carbon nano-tubes each having short length, respectively.

As described above, although the explanations have been given to each of the respective embodiments of the present invention with reference to the drawings, specific embodiments of the present invention are not limited to the above-described embodiments and the various kinds of variation in in design, or the like, to be used without departing from the subject matter of the invention.

For example, as the method of oxidizing, although the method of heating in an atmosphere of oxygen or air has been used, it is possible to selectively oxidize the carbon element in the non-bonded hand even with making use of an oxidizing method in which a gas molecule containing therein oxygen or oxidizing atoms is reduced into plasma condition and the oxygen ions and the plasma thus created are radiated such non-bonded hands or with making use of an oxidizing method in which an oxidizing water solution such as hydrochloric acid, sulfuric acid, or nitric acid is used.

As has been explained above, according to the invention, the nano-tubes including the carbon nano-tubes that has been formed using an arc discharge technique, or the like, each having a long length ranging from 1 $\mu$m to several mm long, can be severed so that each carbon nano-tubes can have the respective length being shorter than a distance formed between an emitter and a gate.

In addition, it can also be possible to form the short carbon nano-tubes without having any unnecessary damages or unnecessary deteriorated portion such as the non-bonded hands, such as the dangling bonds, on a side surface of the carbon nano-tubes.

Accordingly, during and after the manufacturing process of nano-tubes, the nano-tubes have the difficulty of being severed, especially the carbon nano-tubes are difficult to be removed off from an emitter portion, and thus this face can greatly contribute to generate advantages in that unnecessary discharge due to the carbon nano-tubes thus removed off therefrom and the destruction of the device due to such discharge are hardly occurred.

Further, in the emitter formed by such nano-tubes, such mutual entanglements among the carbon nano-tubes which had been typically observed in the conventional method, become seldomly to occur and thus even in a case in that the nano-tubes are mixed together with a binder, the emitter having a flat portion with uniform thickness or uniform surface can be formed.

In addition, compared with the prior art, in the present invention, much more number of the severed portions of the nano-tubes can be formed on the surface of the emitter. And since thus-severed portions of the nano-tubes can serve as the emission points, a lot of electrons can be uniformly emitted within the emitter or between the emitters.

Therefore, the field-emission type cold cathode with a low voltage and a high efficiency, can be formed Further, in the planar display device using this field-emission type cold cathode, a uniform level of emission can be obtained, thereby low-voltage driving becomes possible.

What is claimed is:

1. A fabrication method of a nano-tube, comprising the steps of: radiating ions onto said nano-tube; heating said nano-tube at a temperature of from 300 to 800° C.; and radiating ions onto said nano-tube thus-heated.

2. A fabrication method of a nano-tube, comprising the steps of: radiating ions onto said nano-tube; heating said nano-tube at a temperature of from 300 to 800° C., and radiating ions and an atomic state of atoms onto said nano-tube thus-heated, simultaneously.

3. A manufacturing method of a field-emission type cold cathode, comprising an emitter containing therein nano-tubes, an insulating layer and gate electrode provided so as to surround said emitter, and an anode electrode provided on said gate electrode to thereby cause an emission of electrons from said emitter by applying a voltage to said emitter, said method comprising the steps of: introducing a gas onto said emitter; applying a voltage to one of said gate electrode, said anode electrode, and a newly provided electrode to thereby cause an emission of said electrons; ionizing said gas; and delivering ions of relatively low mass and sufficient energy onto said nano-tube thus-heated in order to produce dangling bonds along the nano-tube surface.

4. A manufacturing method of a field-emission type cold cathode, comprising an emitter containing therein nano-tubes, an insulating layer and gate electrode provided so as to surround said emitter, and an anode electrode provided on said gate electrode to thereby cause an emission of electrons from said emitter by applying a voltage to said emitter, said method comprising the steps of; introducing a gas onto said emitter; applying a voltage to one of said gate electrode, said anode electrode, and a newly provided electrode to thereby cause an emission of said electrons; ionizing said gas; radiating said ionized gas onto said nano-tubes; and oxidizing said nano-tubes.

* * * * *